(12) United States Patent
Lin

(10) Patent No.: US 12,427,812 B2
(45) Date of Patent: Sep. 30, 2025

(54) HIGH-FREQUENCY TRIGGERED TIRE PRESSURE DETECTION SYSTEM AND WAKE-UP METHOD

(71) Applicant: Shih-Yao Lin, Taichung (TW)

(72) Inventor: Shih-Yao Lin, Taichung (TW)

(73) Assignee: SYSGRATION LTD., Taipei (TW)

( * ) Notice: Subject to any disclaimer, the term of this patent is extended or adjusted under 35 U.S.C. 154(b) by 90 days.

(21) Appl. No.: 18/542,782

(22) Filed: Dec. 18, 2023

(65) Prior Publication Data

US 2024/0198739 A1 Jun. 20, 2024

(30) Foreign Application Priority Data

Dec. 20, 2022 (TW) .................................. 111149042

(51) Int. Cl.
*B60C 23/04* (2006.01)

(52) U.S. Cl.
CPC ...... *B60C 23/0454* (2013.01); *B60C 23/0479* (2013.01)

(58) Field of Classification Search
CPC ............ B60C 23/0454; B60C 23/0479; B60C 23/0418; B60C 23/0455; B60C 23/0427; B60C 23/0461; B60C 23/0472; B60C 2200/04; Y02D 30/70; B60R 16/023; H01Q 1/3291; H04W 4/80
USPC ........................................ 340/447
See application file for complete search history.

(56) References Cited

U.S. PATENT DOCUMENTS

| | | | |
|---|---|---|---|
| 9,137,012 B2 * | 9/2015 | Bailey ................... | H04L 63/068 |
| 2007/0186105 A1 * | 8/2007 | Bailey ................ | H04L 63/0492 |
| | | | 713/168 |
| 2008/0018448 A1 * | 1/2008 | Ghabra ............... | B60C 23/0471 |
| | | | 340/447 |
| 2008/0106375 A1 * | 5/2008 | Nakajima ............. | B60R 25/245 |
| | | | 340/5.72 |
| 2009/0009303 A1 * | 1/2009 | Fujioka ................. | B60R 25/245 |
| | | | 340/426.36 |
| 2011/0153120 A1 * | 6/2011 | Katou ................. | B60C 23/0442 |
| | | | 701/2 |

* cited by examiner

*Primary Examiner* — Eric Blount

(57) ABSTRACT

The present invention provides a high-frequency triggered tire pressure detection system, comprising: a vehicle host with no vehicle low-frequency circuit or vehicle low-frequency antenna included therein; a vehicle key with no key low-frequency circuit or key low-frequency antenna included therein; and a plurality of TPMS, matching the host high-frequency transceiver module in high-frequency wireless signals, with no PMS low-frequency circuit or TPMS low-frequency antenna included therein. All of the vehicle host, the vehicle key and the TPMS do not use low-frequency circuits or low-frequency antennas. Communication between these components exclusively uses high-frequency signals. Accordingly, the present invention addresses the conventional issue of using excessively numerous types of antennas.

5 Claims, 4 Drawing Sheets

HIGH-FREQUENCY TRIGGERED TIRE PRESSURE DETECTION SYSTEM AND WAKE-UP METHOD

BACKGROUND OF THE INVENTION

Fields of the Invention

The present invention relates to a high-frequency triggered tire pressure detection system and wake-up method, which combine PEPS and high-frequency wireless technology to wake up the TPMS of a vehicle and display data thereof without the need to physically take the vehicle key or move the vehicle.

Descriptions of Related Art

Tire pressure is an important value related to the safe operation of a vehicle. With technological advancements, the methods for detecting tire pressure have greatly evolved. Initially, tire pressure had to be measured manually for each tire before heading off. Now, various electronic devices can automatically measure and transmit data to a monitoring screen, making the process much more convenient.

In general, a complete tire pressure detection system requires the installation of a tire pressure detector on each wheel. The vehicle's main system should also have a vehicle host for monitoring data. Since the wheels of a moving vehicle spin rapidly, it is not suitable to use wired transmission between the tire pressure detectors and the vehicle host for monitoring data. Wireless transmission is more appropriate. For instance, as shown in FIG. 4, each TPMS 200 needs to have a matching LF device 300 (LF; Low frequency). This requires the vehicle host 100 for monitoring data and TPMS 200 to be individually equipped with high-frequency antennas, low-frequency antennas, high-frequency circuits and low-frequency circuits. The operational process involves using the low-frequency antenna to transmit a low-frequency signal to trigger TPMS 200. Once triggered, TPMS 200 immediately reads data such as voltage, temperature, pressure, and responds with this data using the high-frequency circuit along with the high-frequency antenna.

However, conventional tire pressure detection systems use excessively numerous types of antennas. For example, in the case of each TPMS having one high-frequency antenna and one low-frequency antenna, a vehicle with four wheels would have a total of eight antennas (four high-frequency and four low-frequency antennas). This can place a significant burden on signal transmission and increase costs.

Additionally, with technological advancements, it has become common for vehicle keys to have remote control functions for the vehicle host. This feature is widespread, and many newer car models even have a welcome mode. In this mode, when a driver with the key approaches the detection range of the vehicle, the vehicle automatically unlocks its doors and allows the driver to access the vehicle without taking out the key, achieving the verification of door opening and vehicle startup without physical key usage.

However, similar to the issues with tire pressure detectors, the signal transmission between the key and the vehicle host relies on high-frequency antennas, low-frequency antennas, high-frequency circuits, and low-frequency circuits. Therefore, considering the aforementioned problems related to the configuration of wireless transmission systems for vehicles, the issue of using excessively numerous types of antennas remains a pressing concern in the industry.

SUMMARY OF THE INVENTION

In the present invention, a vehicle host, a vehicle key, and TPMS are equipped with a host high-frequency transceiver module, a key high-frequency transceiver module and a TPMS high-frequency transceiver module, respectively, with no use of low-frequency circuits or low-frequency antennas. The communication between these components exclusively employs high-frequency signals. In comparison to conventional wireless transmission-related systems in vehicles, the present invention effectively addresses the issue of using extensively numerous types of antennas.

To achieve the above objectives and effects, the present invention provides a high-frequency triggered tire pressure detection system, comprising: a vehicle host, which includes a PEPS module and an ECU unit, wherein the PEPS module includes a vehicle key detection unit and is electrically connected to a host high-frequency transceiver module, a host display, and a host electronic lock control module, and the ECU unit is electrically connected to the host display and the host high-frequency transceiver module, with no vehicle low-frequency circuit or vehicle low-frequency antenna included in the vehicle host; a vehicle key, which includes a key central control unit electrically connected to a key storage unit, a power module, and a key high-frequency transceiver module wherein the key high-frequency transceiver module matches the host high-frequency transceiver module in high-frequency wireless signals, with no key low-frequency circuit or key low-frequency antenna included in the vehicle key; and a plurality of TPMS, each of which includes a TPMS central control unit electrically connected to a TPMS high-frequency transceiver module, wherein the TPMS high-frequency transceiver module matches the host high-frequency transceiver module in high-frequency wireless signals, with no PMS low-frequency circuit or TPMS low-frequency antenna included in the TPMS.

The present invention further provides a wake-up method of a high-frequency triggered tire pressure detection system. The method comprises steps in which: a PEPS module periodically emits a high-frequency detection signal via a vehicle key detection unit; if a matching vehicle key enters a transmission range of the vehicle key detection unit, a vehicle key receives the detection signal using a key high-frequency transceiver module, and at this point, a key central control unit within the vehicle key compares the detection signal with an ID of the vehicle key; when a match is found, a key stored in a key storage unit is encrypted and then transmitted to a vehicle host through a high-frequency signal for comparison; if a key verification is successful, the vehicle host sends an unlock signal to command a host electronic lock control module to unlock vehicle doors, while an ECU unit sends a command to a host high-frequency transceiver module to wake up each corresponding TPMS via a wireless high-frequency signal; once awakened, each of the TPMS processes detected data using a TPMS central control unit and transmits a wireless high-frequency signal via a TPMS high-frequency transceiver module to the host high-frequency transceiver module; and the vehicle host receives the signal transmitted from each of the TPMS and then displays the detected data from each of the TPMS on a host display.

DETAILED DESCRIPTION OF THE
PREFERRED EMBODIMENT

Figure 1:
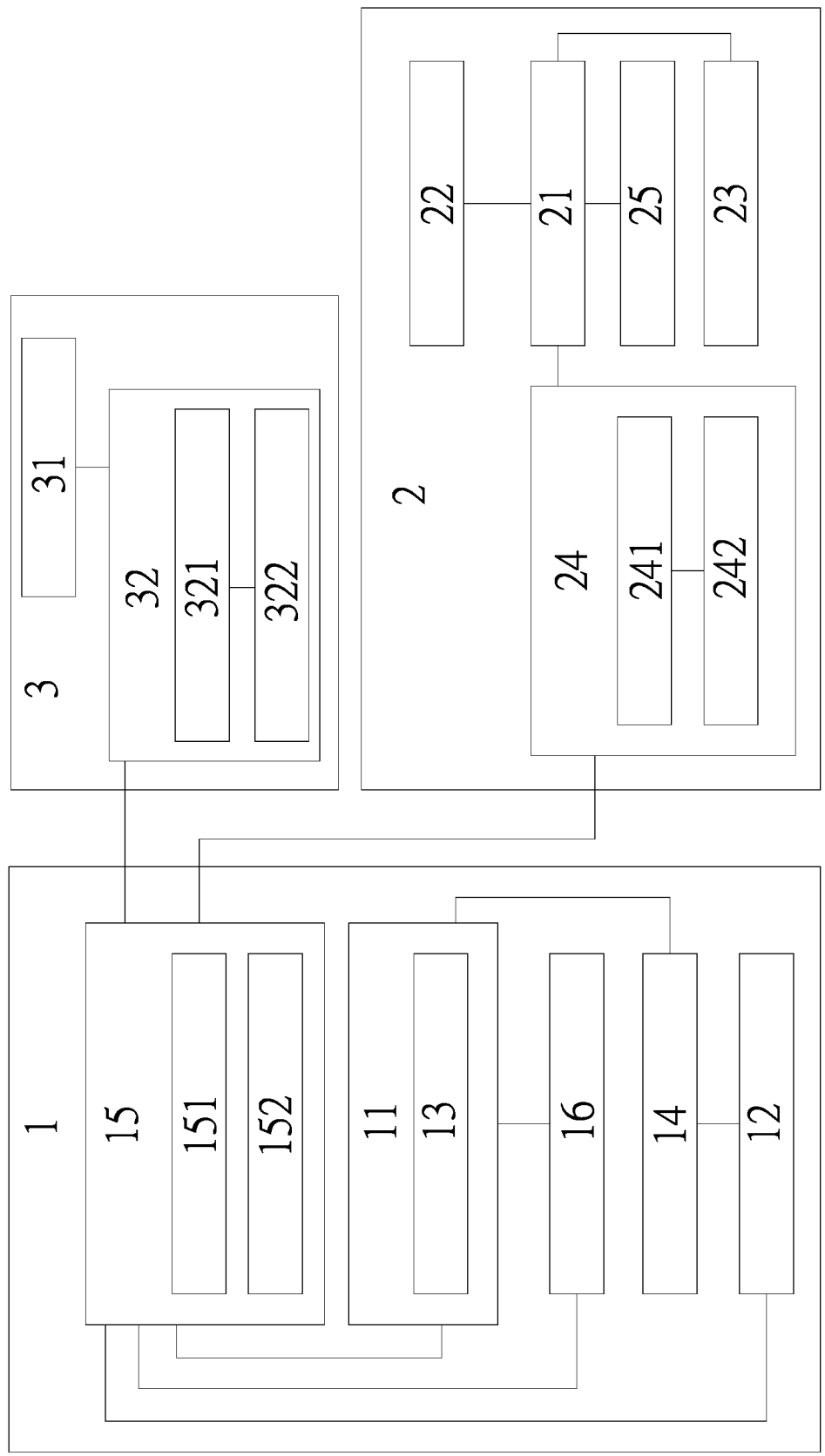
FIG. 1 is a block schematic view of the system architecture of the present invention.
Figure 2:
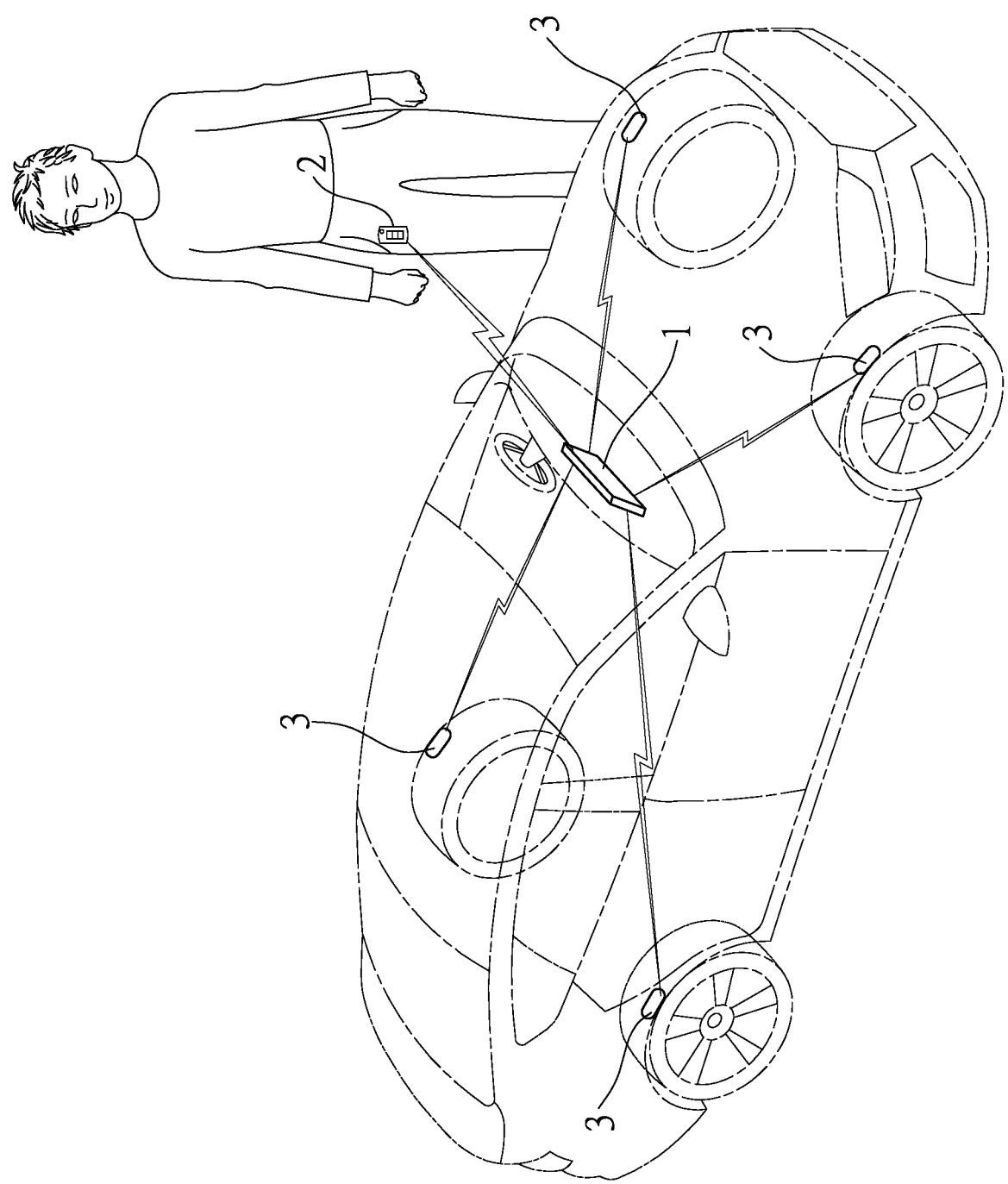
FIG. 2 is a scenario view of the actual application of the present invention.

To better understand the implementations of the present invention, please refer to the accompanying diagrams. As shown in FIGS. 1 and 2, the present invention provides a high-frequency triggered tire pressure detection system, comprising: a vehicle host 1, which includes a PEPS module 11 and an ECU unit 12. The PEPS module 11 includes a vehicle key detection unit 13, and is electrically connected to a host high-frequency transceiver module 15, a host display 14, and a host electronic lock control module 16. The ECU unit 12 is electrically connected to the host display 14 and the host high-frequency transceiver module 15. The vehicle host 1 does not include a vehicle low-frequency circuit or a vehicle low-frequency antenna. The system further comprises a vehicle key 2, which includes a key central control unit 21 electrically connected to a key storage unit 22, a power module 23, a key high-frequency transceiver module 24, and a key display 25. The key high-frequency transceiver module 24 matches the host high-frequency transceiver module 15 in high-frequency wireless signals. The vehicle key 2 does not include a key low-frequency circuit or a key low-frequency antenna. The system further comprises a plurality of TPMS 3, each including a TPMS central control unit 31 electrically connected to a TPMS high-frequency transceiver module 32. The TPMS high-frequency transceiver module 32 matches the host high-frequency transceiver module 15 in high-frequency wireless signals. The plurality of TPMS does not include a TPMS low-frequency circuit or a TPMS low-frequency antenna.

The signal transmission methods for the host high-frequency transceiver module 15, the key high-frequency transceiver module 24, and the TPMS high-frequency transceiver module 32 can be BLE, OOK, RFID, Wi-Fi, UWB, Zigbee, or LPWAN.

The abbreviations as used herein are defined as follows: OOK (On-Off Keying); RFID (Radio Frequency IDentification); UWB (Ultra-wideband); TPMS (Tire-pressure monitoring system); PEPS (Passive Entry and Passive Start); ECU (Electronic Control Unit); LPWAN (Low-Power Wide-Area Network).

The mentioned low-frequency is less than or equal to 150 KHz. In this embodiment, the host high-frequency transceiver module 15 includes a host high-frequency antenna 151 and a host high-frequency RF unit 152, the key high-frequency transceiver module 24 includes a key high-frequency antenna 241 and a key high-frequency RF unit 242, and the TPMS high-frequency transceiver module 32 includes a TPMS high-frequency antenna 321 and a TPMS high-frequency RF unit 322, for example.

Continuing from the above, a wake-up method for the high-frequency triggered tire pressure detection system is further described in detail. The method includes the following steps. The PEPS module 11 periodically emits a high-frequency detection signal from the vehicle key detection unit 13. If a matching vehicle key 2 enters the transmission range of the vehicle key detection unit 13, the vehicle key 2 receives the detection signal using the key high-frequency transceiver module 24. At this point, the key central control unit 21 within the vehicle key 2 compares the detection signal with the ID of the vehicle key 2. When a match is found, the key stored in the key storage unit 22 is encrypted and transmitted to the vehicle host 1 through a high-frequency signal for comparison. If the key verification is successful, the vehicle host 1 sends an unlock signal to command the host electronic lock control module 16 (for example, the vehicle host 1 sends an unlock signal via the PEPS module 11 to command the host electronic lock control module 16) to unlock the vehicle doors. The ECU unit 12 also sends a command to the host high-frequency transceiver module 15 to wake up each TPMS 3 using a wireless high-frequency signal. Once awakened, each TPMS 3 processes the detected data using a TPMS central control unit 31 and transmits a wireless high-frequency signal via a TPMS high-frequency transceiver module 32 to the host high-frequency transceiver module 15 (the key high-frequency transceiver module 24). The vehicle host 1 (the vehicle key 2) receives the signal transmitted from each TPMS 3 and then displays the detected data on the host display 14 (the key display 25).

Figure 3:
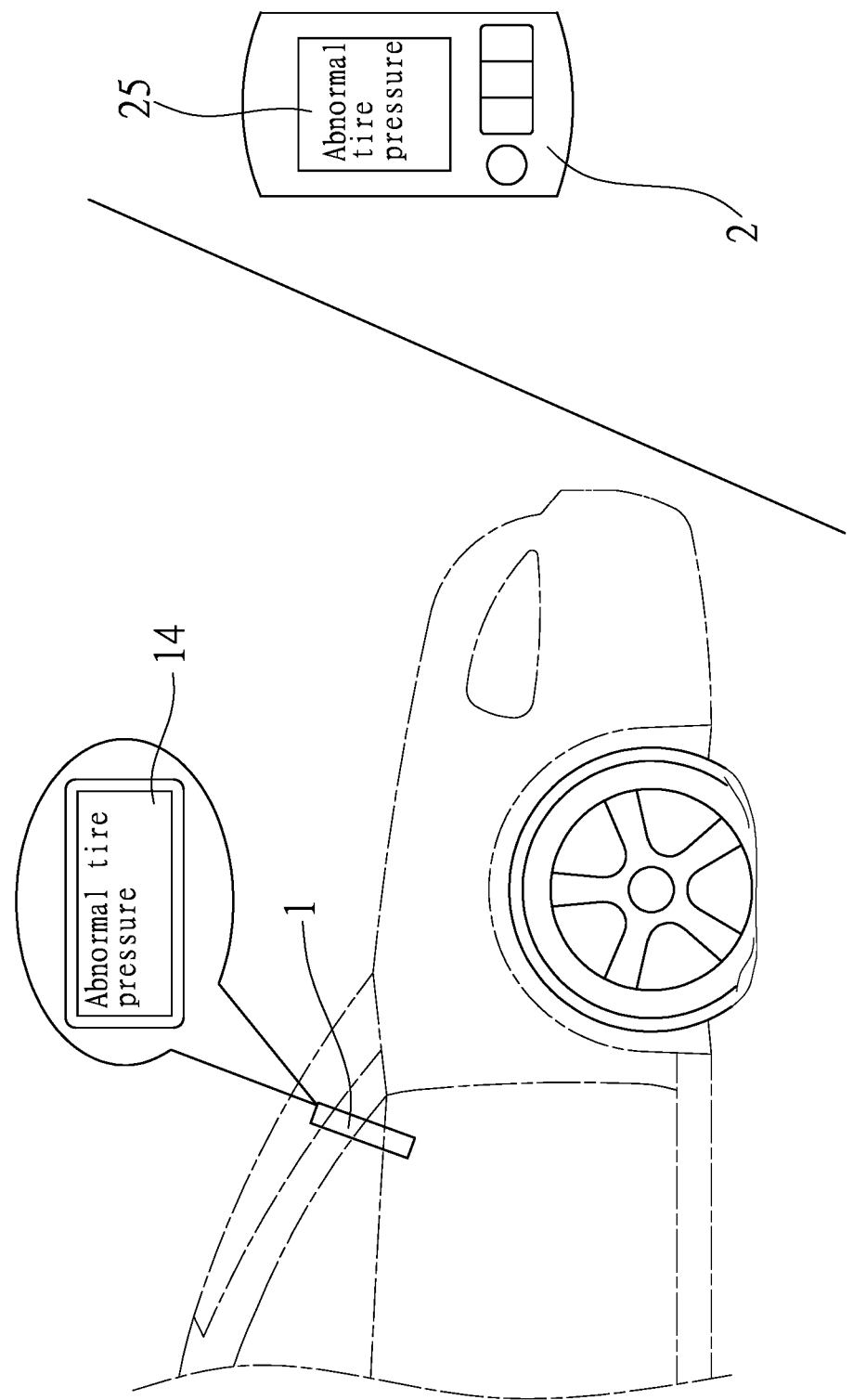
FIG. 3 is a scenario view of tire pressure abnormalities in the actual application of the present invention.
Figure 4:
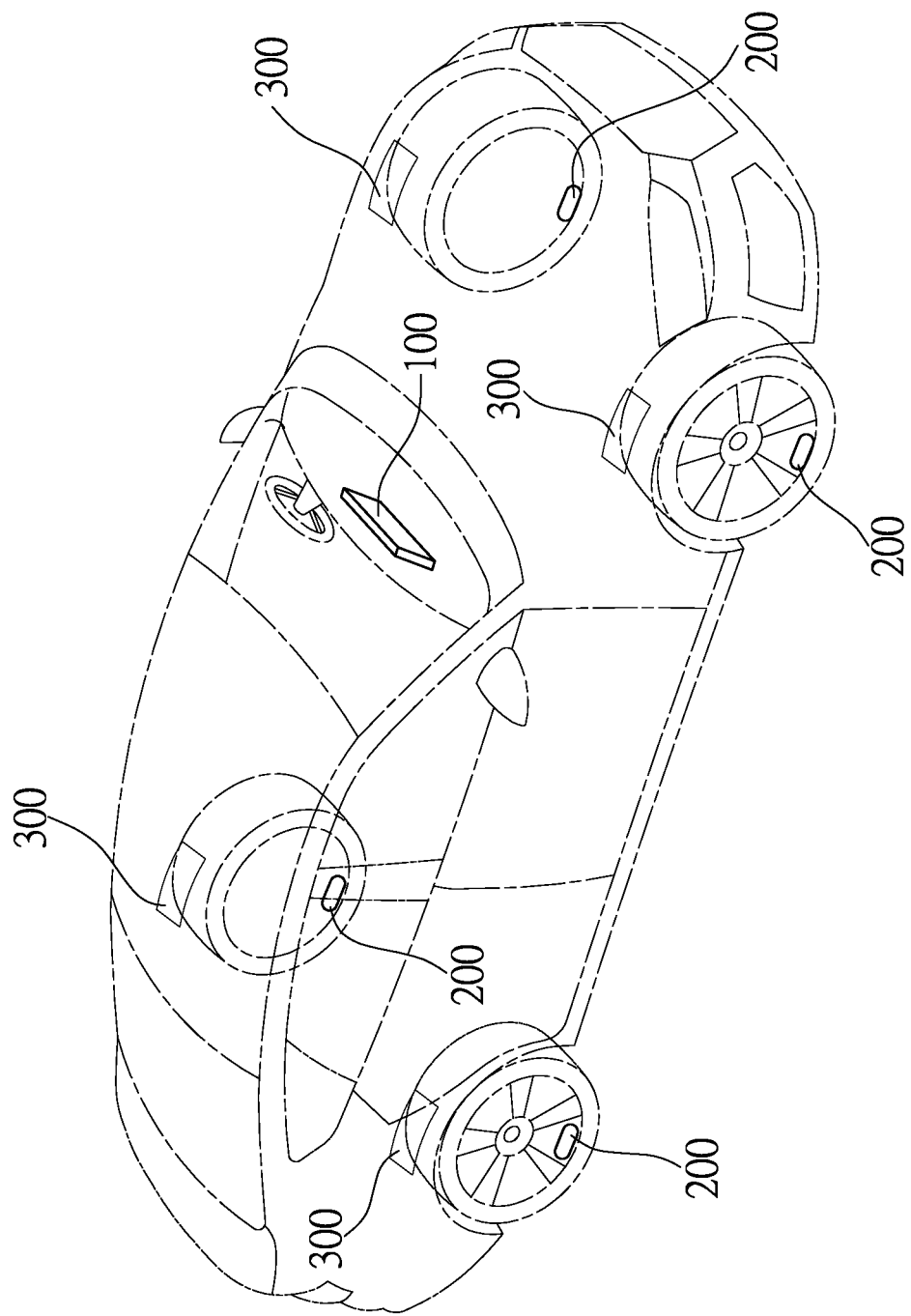
FIG. 4 is a schematic view of a conventional vehicle system.

In summary, it can be seen that in the present invention, the vehicle host 1, the vehicle key 2, and the TPMS 3 are equipped with the host high-frequency transceiver module 15, the key high-frequency transceiver module 24, and the TPMS high-frequency transceiver module 32, respectively. None of them use low-frequency circuits or low-frequency antennas. Communication between these components exclusively uses high-frequency signals. Compared to conventional systems, the present invention significantly improves the configuration of wireless transmission-related systems in vehicles, addressing the issue of using excessively numerous types of antennas. In the present invention, the vehicle host 1 saves one set of low-frequency antenna and circuit, the vehicle key 2 also saves one set of low-frequency antenna and circuit, and the TPMS 3 (generally four TPMS 3 are required) saves four sets of low-frequency antennas and circuits. Therefore, the present invention saves at least six sets of low-frequency antennas and circuits compared to conventional systems, resulting in cost savings related to components and the elimination of production and installation costs for low-frequency antennas and circuits. As shown in FIG. 3, in the present invention, the integration with PEPS enables the vehicle to acquire tire pressure values without the need to start or move the vehicle, overcoming the limitation found in most traditional technologies that require vehicle movement to transmit tire pressure values. It is important to note that it is quite dangerous if tire pressure issues are discovered only after the vehicle has moved. As shown in FIG. 3, if the tire pressure inside the front tire is already insufficient or the tire is damaged before the vehicle moves, the rolling of the wheels can cause the tire to be unable to effectively protect the tire frame, leading to damage and deformation of the tire frame. Therefore, the ability for the vehicle to obtain tire pressure values without starting or moving is highly necessary.

The above description is intended solely to explain a preferred embodiment of the present invention and is not intended to impose any form of limitation on the present invention. Therefore, any modifications or changes made to the present invention that fall within the same spirit of the present invention and achieve the same effects should still be included within the scope of the present invention.

In summary, the present invention, "A High-Frequency Triggered Tire Pressure Detection System and Wake-up Method", is highly practical and cost-effective, meeting the needs of industry development. The structural invention disclosed herein also features an unprecedented innovative design, and thus undoubtedly meets the "novelty" requirement. Furthermore, the present invention enhances the effectiveness compared to conventional structures and thus also meets the "non-obviousness" requirement. The present invention fully complies with the requirements for a utility patent application according to the patent law.

What is claimed is:

1. A wake-up method of a high-frequency triggered tire pressure detection system, the method comprising steps in which:
a PEPS module periodically emits a high-frequency detection signal via a vehicle key detection unit; if a matching vehicle key enters a transmission range of the vehicle key detection unit, a vehicle key receives the detection signal using a key high-frequency transceiver module, and at this point, a key central control unit within the vehicle key compares the detection signal with an ID of the vehicle key; when a match is found, a key stored in a key storage unit is encrypted and then transmitted to a vehicle host through a high-frequency signal for comparison; if a key verification is successful, the vehicle host sends an unlock signal to command a host electronic lock control module to unlock vehicle doors, while an ECU unit sends a command to a host high-frequency transceiver module to wake up each corresponding TPMS via a wireless high-frequency signal; once awakened, each of the TPMS processes detected data using a TPMS central control unit and transmits a wireless high-frequency signal via a TPMS high-frequency transceiver module to the host high-frequency transceiver module; and the vehicle host receives the signal transmitted from each of the TPMS and then displays the detected data from each of the TPMS on a host display.

2. The wake-up method of a high-frequency triggered tire pressure detection system as claimed in claim 1, wherein the host high-frequency transceiver module, the key high-frequency transceiver module, and the TPMS high-frequency transceiver module are configured for signal transmission using BLE, OOK, RFID, Wi-Fi, UWB, Zigbee, or LPWAN.

3. The wake-up method of a high-frequency triggered tire pressure detection system as claimed in claim 1, wherein the host high-frequency transceiver module includes a host high-frequency antenna and a host high-frequency RF unit, the key high-frequency transceiver module includes a key high-frequency antenna and a key high-frequency RF unit, and the TPMS high-frequency transceiver module includes a TPMS high-frequency antenna and a TPMS high-frequency RF unit.

4. The wake-up method of a high-frequency triggered tire pressure detection system as claimed in claim 1, the method further comprising steps in which: once awakened, each of the TPMS processes the detected data using the TPMS central control unit and transmits the wireless high-frequency signal via the TPMS high-frequency transceiver module to the key high-frequency transceiver module; and the vehicle key receives the signal transmitted from each of the TPMS and then displays the detected data from each of the TPMS on a key display.

5. The wake-up method of a high-frequency triggered tire pressure detection system as claimed in claim 1, wherein the key central control unit is electrically connected to a key display.

* * * * *